(12) United States Patent
Duncan

(10) Patent No.: US 6,481,800 B2
(45) Date of Patent: Nov. 19, 2002

(54) DINETTE CHILD SAFETY SEAT ATTACHMENT SYSTEM

(75) Inventor: Gary L. Duncan, Middlebury, IN (US)

(73) Assignee: Coachmen Recreational Vehicle Company, Elkhart, IN (US)

( * ) Notice: Subject to any disclaimer, the term of this patent is extended or adjusted under 35 U.S.C. 154(b) by 0 days.

(21) Appl. No.: 09/784,241

(22) Filed: Feb. 15, 2001

(65) Prior Publication Data

US 2002/0109381 A1 Aug. 15, 2002

(51) Int. Cl.[7] .................................................. A47C 7/02
(52) U.S. Cl. ................... 297/452.2; 297/250.1; 297/253; 297/254
(58) Field of Search .............................. 297/250.1, 253, 297/254, 452.18, 452.2

(56) References Cited

U.S. PATENT DOCUMENTS

| | | | | |
|---|---|---|---|---|
| 5,575,533 A | * | 11/1996 | Glance | 297/452.2 |
| 5,746,476 A | * | 5/1998 | Novak et al. | 297/452.2 X |
| 5,845,967 A | * | 12/1998 | Kane et al. | 297/250.1 |
| 5,918,934 A | * | 7/1999 | Siegrist | 297/250.1 |
| 5,941,600 A | * | 8/1999 | Mar et al. | 297/254 X |
| 6,082,818 A | * | 7/2000 | Muller | 297/253 X |
| 6,095,604 A | * | 8/2000 | Stack et al. | 297/254 |
| 6,234,572 B1 | * | 5/2001 | Shiino et al. | 297/253 |
| 6,267,441 B1 | * | 7/2001 | Otero | 297/354 |
| 6,267,442 B1 | * | 7/2001 | Shiino et al. | 297/254 |
| 6,276,754 B1 | * | 8/2001 | Youssef-Agha | 297/253 |

* cited by examiner

*Primary Examiner*—Rodney B. White
(74) *Attorney, Agent, or Firm*—Price, Heneveld, Cooper, DeWitt & Litton

(57) ABSTRACT

A bench-type dinette seat frame includes a pair of spaced-apart anchor bars positioned at the junction of a seat section and a back section of the dinette frame and a third attachment point positioned above and intermediate the first and second spaced apart anchors to provide a three-point attachment of a child safety seat to the dinette frame.

14 Claims, 6 Drawing Sheets

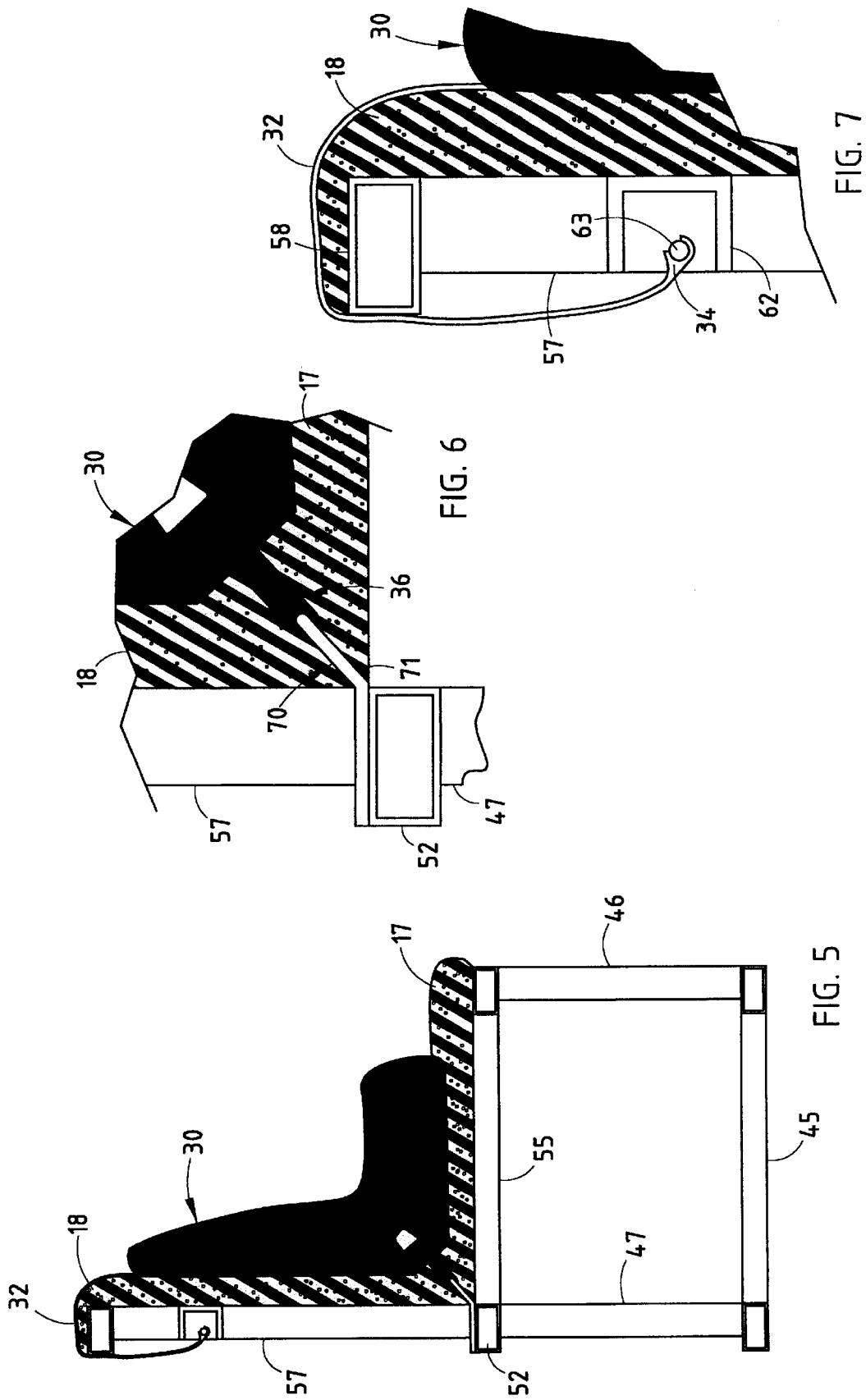

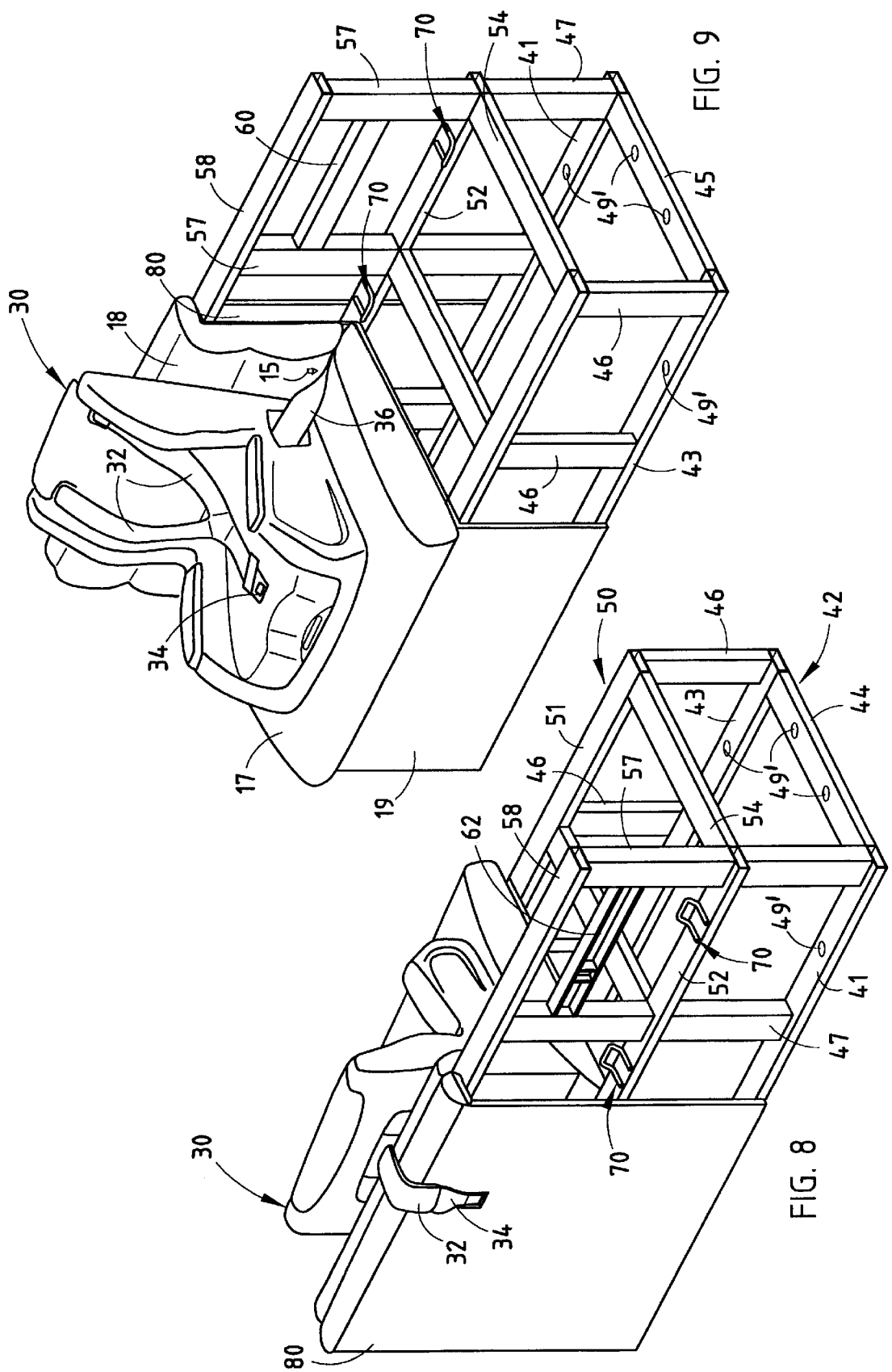

DINETTE CHILD SAFETY SEAT ATTACHMENT SYSTEM

BACKGROUND OF THE INVENTION

The present invention relates to recreational vehicles and particularly to an attachment system for attaching child safety seats to a dinette bench.

Standards have been developed by the Department of Transportation for regulating the attachment of child safety seats in a uniform manner in vehicles, such as automobiles. Such standards include FMVSS213 and FMVSS225 relating to the child restraints and the anchorage points, respectively. Basically, it is desired to provide a uniform system which meets minimum requirements which assures that a child safety seat will remain in situ in the event of an accident. Thus, for example, FMVSS225 for an anchorage point requires that an anchor point withstand a static force of 3000 pounds at each point with a maximum of 5" deflection of the anchor point.

Typically, for vehicles such as automobiles, a commercially available child safety seat will be attached at two locations on either side of the child safety seat to anchor points located at the intersection of the vehicle seat and seat back. A third anchor point is provided higher on the seat back such that a tether at the upper portion of the child safety seat attaches to such anchor point to prevent the upper portion of the safety seat from lurching forwardly in the event of an accident. Such a safety seat installation cannot easily be accommodated in recreational vehicles, since other design considerations come into play. Front passenger seats are typically captain-chair type plush upholstered seats which render them virtually impossible to fasten safety seats securely to them. Further, some motor homes are equipped with passenger side airbags and child safety seats are not recommended for front passenger seats having such airbags.

Sofas employed in recreational vehicles typically are side facing and child safety seats are not designed or approved for a side-facing installation. Lounge chairs also frequently used in recreational vehicles behind the cockpit area are typically pedestal mounted and the mounting of a child safety seat in such a standard lounge chair would be extremely difficult due, in part, to the plushness of the chair itself. Further, the pedestal mount itself would normally not be able to withstand the above referenced stress and deflection requirements of an attachment system if mounted in such a seat. Thus, the floor and pedestal mount would of necessity need to be redesigned at a great expense and additional weight to the vehicle.

SUMMARY OF THE INVENTION

Recreational vehicles, such as motorhomes, for example, typically include a dinette with a table which can be lowered for converting the dinette into a sleeping berth. In order to accommodate child safety seats in a recreational vehicle, a bench-type dinette seat in a preferred embodiment of the invention includes three anchor points arranged in a triangle on the seat frame for the attachment of a child safety seat. A forward facing dinette bench seat allows room for the location of two child safety seats in the preferred forward-facing position. The footprint of such a bench seat distributes the load over a relatively wide area of the floor structure and, thus, can pass the stress and deflection tests. Use of a dinette, however, presents its own problems for the mounting of a child safety seat in view of the dinette table which, when in a raised position, would interfere with the parent attaching the child safety seat to a dinette bench seat as well as placing the child in and removing the child from the safety seat once attached. Thus, the dinette table preferably includes a drop leaf which provides sufficient clearance for the anchor mount deflection to prevent a child from contacting a table edge in the event of an accident or the table must be designed to be able to be moved to a lower position where it does not interfere with the safety zone of 5 inches.

Systems embodying the preferred embodiment of the invention comprise a bench-type dinette seat for a recreational vehicle having a frame with said frame including a pair of spaced-apart anchor bars positioned at the junction of a seat section and a back section of the dinette frame and a third attachment point positioned above and intermediate the first and second spaced apart anchors for the three-point attachment of a child safety seat to the dinette frame.

In a preferred embodiment of the invention, the dinette includes two such anchor systems such that two child safety seats can be mounted therein. In yet another embodiment of the invention, the dinette frame is made of tubular steel members. Suitable upholstery cushions are provided on the seat section of the frame and the back section of the frame, exposing the anchor points to the user. Such upholstery may include indicia aligned with the anchor points for providing the user with guidance in attaching the child safety seat to the dinette seat.

These and other features, objects and advantages of the present invention will become apparent upon reading the following description thereof together with reference to the accompanying drawings.

BRIEF DESCRIPTION OF THE DRAWINGS

FIG. 5 is a vertical cross-sectional and schematic view of a child safety seat mounted to the dinette seat shown in FIG. 4;

FIG. 6 is an enlarged fragmentary cross-sectional view of the lower attachment of one side of child safety seat shown in FIG. 5;

FIG. 7 is an enlarged fragmentary cross-sectional view of the upper tether attachment of the child safety eat to the dinette seat shown in FIG. 5;

FIG. 8 is a rear perspective view of the child safety seat shown attached to the dinette seat as shown in FIG. 4; and FIG. 9 is a front perspective view of a child safety seat mounted to the dinette seat on the other side and shown with the upholstery partially broken away.

DETAILED DESCRIPTION OF THE PREFERRED EMBODIMENT

Figure 1:
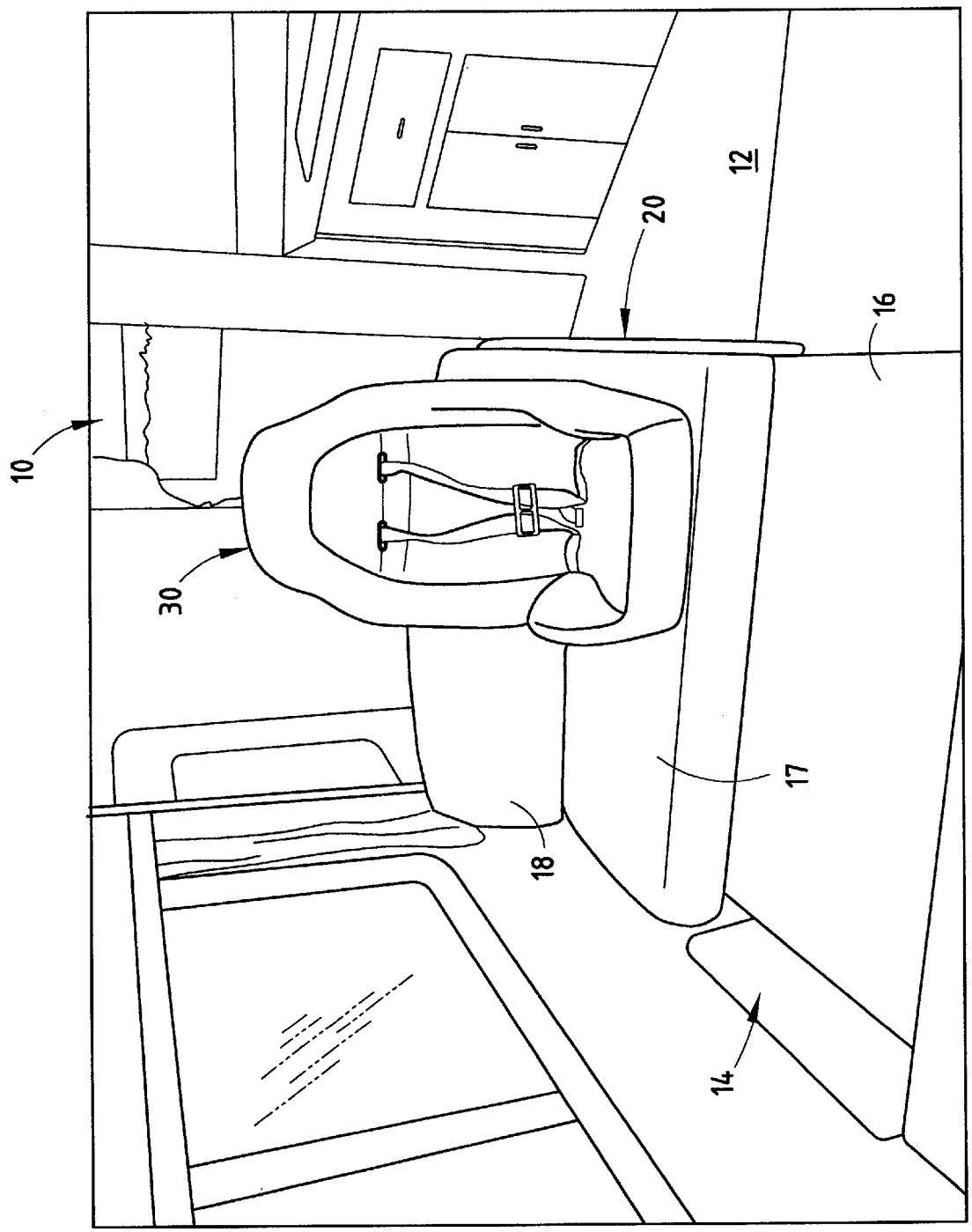
FIG. 1 is a perspective view of the interior dinette area of a recreational vehicle including the seat attachment system of the present invention.

Referring initially to FIG. 1, there is shown the interior of a recreational vehicle 10, such as a motorhome, which includes a floor 12 supported on a frame and chassis of the motorhome in a conventional manner. Adjustably mounted to the floor in a dinette area 14 is a dinette table 16 which can be moved between a lowered position, shown in FIG. 1, to a raised position, allowing occupants to comfortably use the dinette table 16 for its normal functions. In the lowered position, the seating surface 17 of a dinette seat 20 having a seat back 18 intersecting with the seating surface 17 is fully exposed to allow a child safety seat 30 to be mounted to the dinette seat 20 in a forward facing position, as seen in FIG. 1, by means of the child safety seat attachment system described in detail in connection with FIGS. 2–9 now described.

The underlying elongated generally rectangular frame 40 for the dinette seat 20 (shown in FIG. 1) is shown in FIGS. 2–9 and includes a base 42 having transversely extending struts 41 and 43 joined by longitudinal struts 44 and 45. The struts are made of 1"×2" steel tubes welded into an elongated rectangular base 42. Spaced-apart front and rear risers 46 and 47, respectively, extend upwardly from the base 42 with front risers 46 being made of 1"×2" steel tubes and rear risers 47 being made of 1½"×2" tube members. The four equally spaced risers 46 and 47 support a seat support platform comprising a frame 50 made of a forward tube member 51, a rearward tube member 52, end tubes 53 and 54 and intermediate tubes 55 and 56, all comprising 1"×2" steel tubes welded to one another and to risers 46 and 47 which are welded to base 42.

Figure 2:
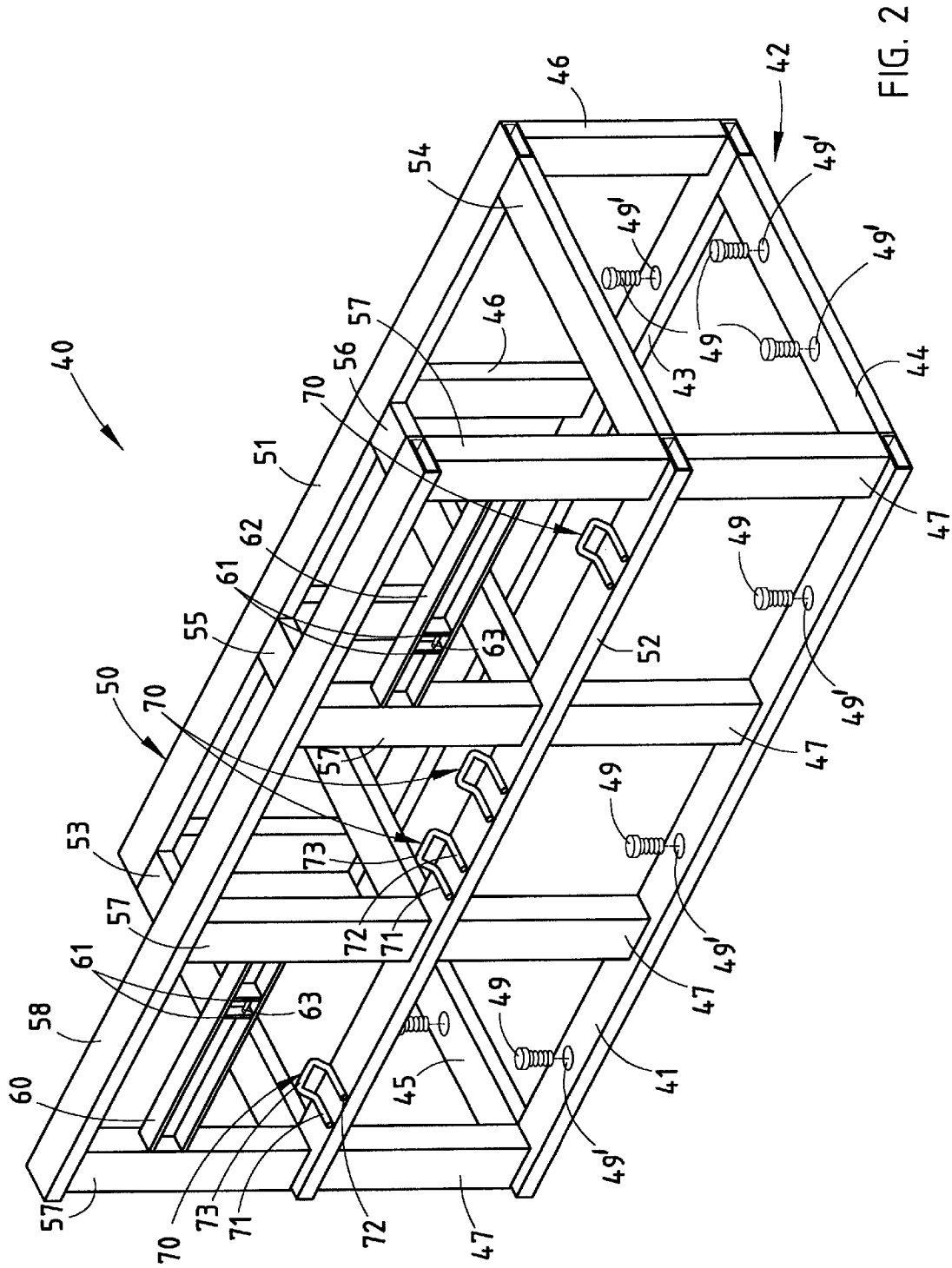
FIG. 2 is a rear perspective view of a dinette seat frame embodying the present invention.
Figure 3:
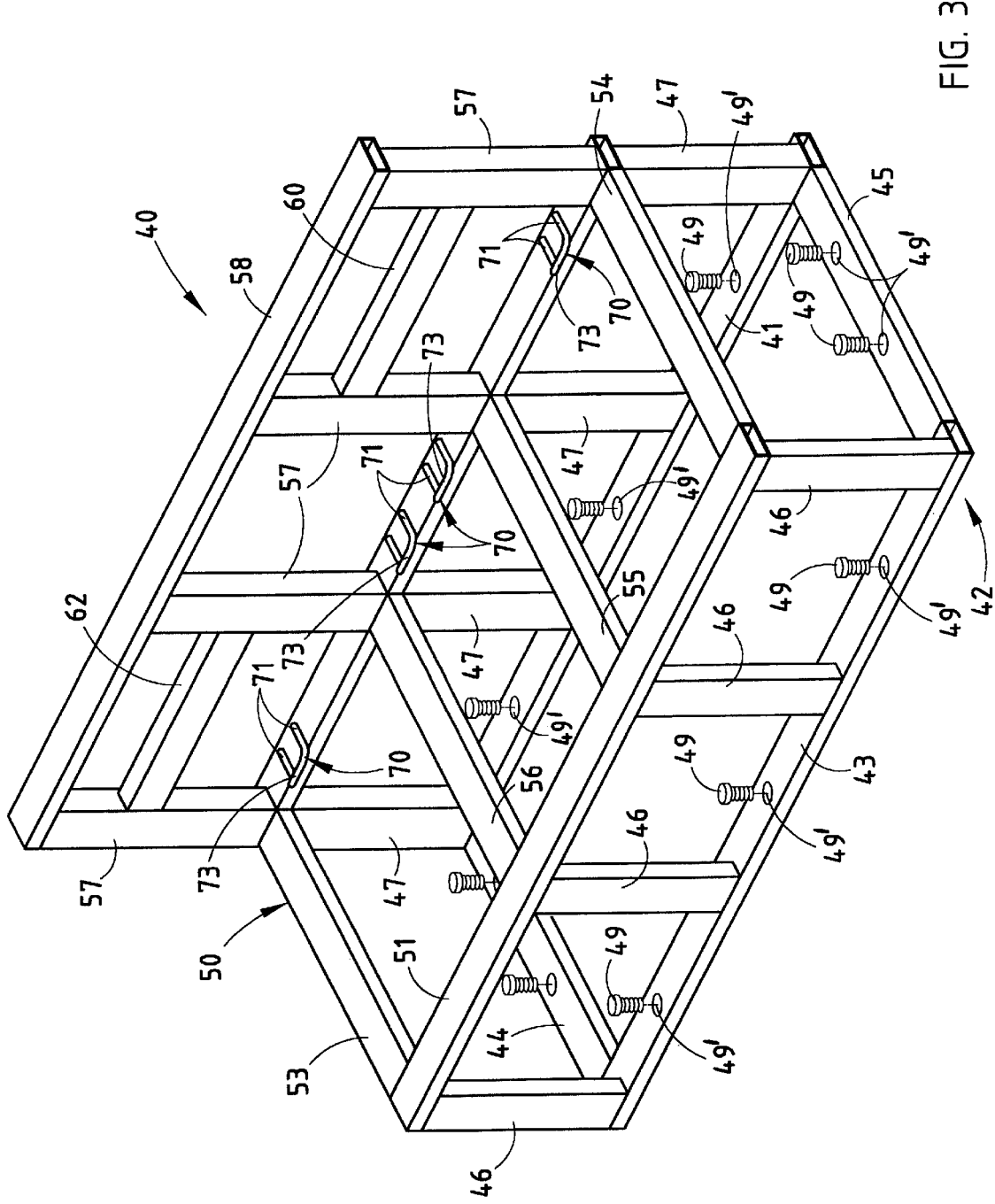
FIG. 3 is a front perspective view of the dinette seat frame shown in FIG. 2.

Frame 50 defines the seating area of the dinette seat 20 which includes a seat back support including upper risers 57, which are coaxial with rear risers 47 and a top rail 58 welded to the upper ends of risers 57 which, in turn, are welded to rear tube 52 to form an integral bench-like frame structure 40. Extending horizontally between outer risers 57 and adjacent inner risers 57 are a pair of U-shaped channel members 60 and 62 which are positioned slightly below top rail 58 and which open rearwardly, as seen in FIG. 2, and include a boxed in section comprising spaced-apart vertical walls 61 between which there is welded a 6.4 mm rod 63 defining one anchor point for receiving a snap hook of a tether as described in greater detail below in connection with the child safety seat 30.

Spaced-apart anchor bars, comprising generally U-shaped anchor members 70, are positioned on rear rail 52 with a pair of such members 70 associated with each side of the dinette seating area 17 (FIG. 1) such that two child safety seats 30 can be anchored thereto. Each of the anchor members 70 include a pair of inclined legs 71 and 72 with the legs extending upwardly to the connecting rod 73 to incline upwardly from the rear tube 52 to position rod 73 for access by an attachment clip associated with the child safety seat 30. Thus, the bent U-shaped members 70 provide an upwardly and outwardly projecting rod 73 which is accessible at the intersection of the seating area 17 and the back area 18 on either side of the child safety seat 30 for anchoring the lower section of the child safety seat to the frame 40. Frame 40 is attached to the floor 12 of the recreational vehicle 10 by means of attachment bolts 49, which extend through apertures 49' in the base 42 at spaced-apart locations. Bolts 49 extend through the laminated underlayment of floor 12 and through the steel supporting structure of the vehicle frame to securely anchor the seat frame 40 to the vehicle floor 12. Members 70 are made of 6 mm diameter steel rods to conform (as do rods 63) to the FMVSS safety standards required for anchor bars for securing child safety seats to a vehicle.

Figure 4:
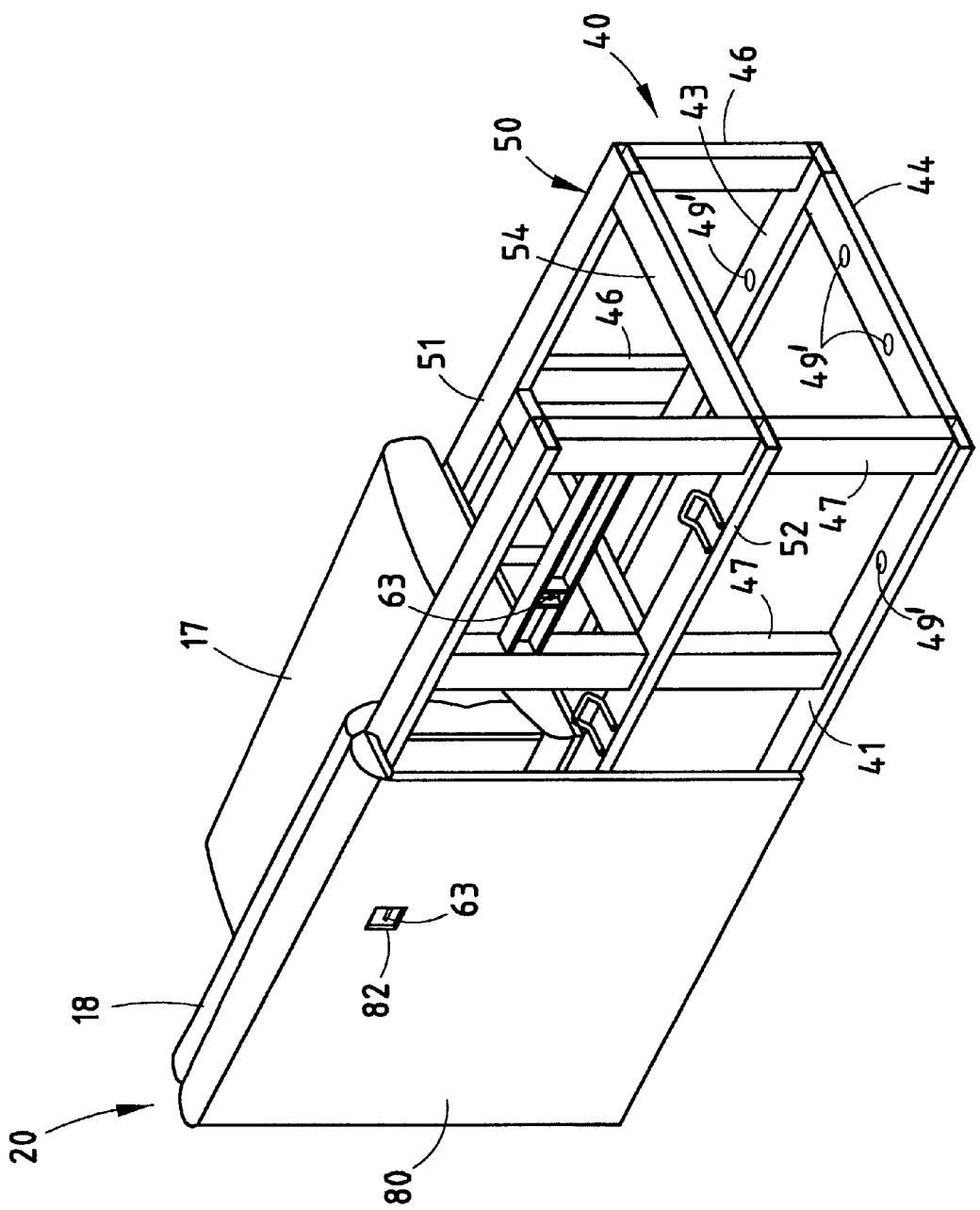
FIG. 4 is a rear perspective view of the frame shown in FIG. 2, shown with the upholstery partially broken away.

As best seen in FIG. 4, the seat frame 40 includes a seating cushion 17 (shown in fragmentary form in FIG. 4), which covers the rectangular seat area frame 50 and a seat back cushion 18 covering the upright back area comprising risers 57 and top rail 58. The back side of the seat 20 so formed is upholstered with a suitable upholstery panel 80 which includes an aperture 82 formed therein and aligned with the tether anchor bar 63 for each side of the seat. Thus, the lower spaced-apart anchor members 70 and the spaced-apart anchor bars 63 define a triangular anchor system for a child safety seat. The elongated bench seat 20 can accommodate two such anchor systems for two child safety seats 30 in side-by-side relationship if desired. Also, although a forward facing seat is preferred, a dinette may include a rearward facing seat with similar frame construction for lockably securing one or more child safety seats thereto.

The seat pad 17 and seat back pad 18 can be of conventional construction insofar as they are made of a closed-cell urethane foam cushion covered by a suitable upholstery material, however, it differs in that, as seen in FIG. 9, the upholstery layer, in alignment with one of the anchor members 70, includes suitable printed indicia 15 indicating to the user the location of the anchor member 70 between seat cushion 17 and back cushion 18. Child safety seats 30 are commercially available and are manufactured with an upper tether strap 32 having a hook 34 at the end thereof for securing the upper portion of seat 30 to the anchor bar 63, as illustrated in FIG. 8, by extending over the top rail 58 of the seat back and over the back panel 80 to engage the anchor bar 63. The seats 30 also include a hook mechanism 36 on either side, shown schematically in FIG. 6, for engaging a anchor bar 73 of each of the locking members 70. Thus, the child safety seat 30 is anchored in laterally spaced relationship at its lower end at the intersection of seat back 18 and seat cushion 17 by tether straps 36 and clips 38 for locking tethers 36 onto anchor bar 73. Frame 40 of dinette seat 20 is suitably enclosed by decorative panels 19 at the sides and lower end as represented by the fragmentary panel 19 in FIG. 9.

It will become apparent to those skilled in the art that various modifications to the preferred embodiment of the invention as described herein can be made without departing from the spirit or scope of the invention as defined by the appended claims.

The invention claimed is:

1. A dinette seat for a recreational vehicle comprising:
    a tubular steel seat frame having integrally coupled frame members, the frame members including at least a pair of parallel, vertically spaced apart front and back transversely extending frame members, at least two pairs of parallel, vertically spaced apart longitudinal frame members connecting the transversely extending frame members, and at least two pairs of parallel, vertically extending frame members connecting the respective transversely extending frame members defining a generally horizontal seating platform and a fixed generally vertically extending seat back support;
    a pair of spaced apart anchor bars secured to said seat frame generally at the junction of said seat platform and back support for receiving anchor fasteners of a child safety seat; and
    an anchor bar secured to said seat frame at the seat back support for receiving an attachment fastener from a tether extending from the top of a child safety seat, such that the child safety seat is adapted for being anchored to the dinette seat frame at three spaced locations.

2. The dinette seat as defined in claim 1 wherein said dinette seat includes a seat cushion positioned on said seat platform and a back cushion positioned against said back support.

3. The dinette seat as defined in claim 2 and further including indicia on one of said back and seat cushions, said indicia aligned with the anchor bar at the junction of the seat cushion and back cushion.

4. The dinette seat as defined in claim 3 wherein the anchor bar comprises a generally U-shaped rod having a pair of depending legs coupled by a cross member defining an anchor bar.

5. The dinette seat as defined in claim 4 wherein the legs of said U-shaped member are bent to incline the anchor bar upwardly and outwardly from the junction of the seat platform and seat back support.

6. The dinette seat as defined in claim 1 wherein the vertical frame members defining the seat back have a dimension larger than the remaining frame members.

7. The dinette seat as defined in claim 6 wherein said vertical frame members are 2"×1½.

8. The dinette seat as defined in claim 7 wherein the remaining frame members are 2"×1".

9. The dinette seat as defined in claim 8 wherein said dinette seat includes a seat cushion positioned on said seat platform and a back cushion positioned against said back support.

10. The dinette seat as defined in claim 9 and further including indicia on one of said back or seat cushion aligned with the anchor pin at the junction of the seat back and seat frame.

11. A recreational vehicle dinette seat for anchoring a child safety seat in the dinette area of the recreational vehicle, said dinette seat comprising:

a tubular steel elongated rectangular seat frame comprising welded frame members, the frame members including at least a pair of parallel, vertically spaced apart front and back transversely extending struts, at least two pairs of parallel, vertically spaced apart lateral struts connecting the transversely extending struts, and at least two pairs of parallel, vertically extending risers connecting the respective transversely extending struts defining a generally horizontal seating platform and a fixed generally vertically extending seat back support;

a pair of spaced apart generally U-shaped members secured to said seat frame for providing anchor bars at the junction of said seat platform and back support for receiving anchor clips of a child safety seat; and an anchor bar secured to said seat frame at the seat back support for receiving an attachment clip from a tether extending from the top of a child safety seat, such that the child safety seat is adapted for being anchored to the dinette seat frame at three spaced locations.

12. The dinette seat as defined in claim 11 wherein said dinette seat includes a seat cushion positioned on said seat platform and a back cushion positioned against said back support.

13. The dinette seat as defined in claim 12 and further including indicia on one of said back or seat cushion aligned with the anchor bar at the junction of the seat back and seat frame to provide the user with information identifying the location of the anchor bars.

14. The dinette seat as defined in claim 11 wherein said U-shaped members have a pair of depending legs coupled by a cross member and said legs are bent to incline the anchor bar upwardly and outwardly from the junction of the seat platform and seat back support.

* * * * *